US012783530B2

(12) United States Patent
Wu et al.

(10) Patent No.: US 12,783,530 B2
(45) Date of Patent: Nov. 3, 2026

(54) SYSTEMS AND METHODS FOR MINIMIZING LATENCY IN NETWORK MODELS TO FACILITATE REAL-TIME APPLICATIONS

(71) Applicant: Capital One Services, LLC, McLean, VA (US)

(72) Inventors: Jingyu Wu, Jersey City, NJ (US); Alfy Samuel, White Plains, NY (US); Aditya Shrivastava, McLean, VA (US); Daben Liu, Belmont, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/226,072

(22) Filed: Jun. 2, 2025

(65) Prior Publication Data

US 2026/0147772 A1 May 28, 2026

Related U.S. Application Data

(60) Provisional application No. 63/726,173, filed on Nov. 27, 2024.

(51) Int. Cl.

| | |
|---|---|
| ***G06F 16/2457*** | (2019.01) |
| ***G06F 16/248*** | (2019.01) |
| ***G06F 16/27*** | (2019.01) |
| ***H04L 45/121*** | (2022.01) |

(52) U.S. Cl.
CPC ...... *G06F 16/24578* (2019.01); *G06F 16/248* (2019.01); *G06F 16/27* (2019.01); *H04L 45/121* (2013.01)

(58) Field of Classification Search
CPC .. G06F 16/24578; G06F 16/248; G06F 16/27; G06F 16/273; G06F 16/275; G06F 16/278; H04L 45/121
USPC .......................................................... 707/748
See application file for complete search history.

(56) References Cited

U.S. PATENT DOCUMENTS 12,499,115 B1 * 12/2025 Niu .................. G06F 16/24578
2025/0103592 A1 * 3/2025 Niu ....................... G06F 40/295
2026/0057016 A1 * 2/2026 Vouitsis .................. G06F 16/93
2026/0073254 A1 * 3/2026 Guo ......................... G06N 5/04

* cited by examiner

*Primary Examiner* — Michael Pham
(74) *Attorney, Agent, or Firm* — Foley & Lardner LLP

(57) ABSTRACT

The system may determine, based on a first network query, an initial ranking of a first subset of network items. The system may retrieve a first pair of network items from the first subset of network items. The system may generate a first network prompt based on the first network query and the first pair of network items. The system may input the first network prompt into a pairwise reranking module, wherein the pairwise reranking module is supplemented by a first optimization model. The system may receive a first single token output from the pairwise reranking module.

20 Claims, 5 Drawing Sheets

| Optimization Method | Pairwise Reranker | TopK | Recall @10 | Recall @5 | Recall @3 | Recall @1 | Latency (s) |
|---|---|---|---|---|---|---|---|
| - | Flan-UL2 | 25 | 0.85 | 0.79 | 0.74 | 0.54 | 61.36 |
| Smaller Model | Flan-T5-XL | 25 | 0.85 | 0.81 | 0.75 | 0.56 | 22.5 |
| + Smaller TopK | Flan-T5-XL | 5 | 0.84 | 0.77 | 0.71 | 0.54 | 3.27 |
| + Quantization | Flan-T5-XL | 5 | 0.84 | 0.77 | 0.71 | 0.54 | 2.23 |
| + One-directional comparison | Flan-T5-XL | 5 | 0.84 | 0.77 | 0.71 | 0.54 | 1.11 |
| + Prompt Engineering and Single Token Generation | Flan-T5-XL | 5 | 0.84 | 0.77 | 0.71 | 0.54 | **0.37** |

FIG. 2

SYSTEMS AND METHODS FOR MINIMIZING LATENCY IN NETWORK MODELS TO FACILITATE REAL-TIME APPLICATIONS

CROSS-REFERENCE TO RELATED APPLICATION(S)

This application claims the benefit of priority of U.S. Provisional Patent Application No. 63/726,173, filed Nov. 27, 2024. The content of the foregoing application is incorporated herein in its entirety by reference.

BACKGROUND

LLMs, or Large Language Models, are advanced artificial intelligence systems designed to understand, generate, and process human language in a sophisticated manner. These models are built using deep learning techniques, often relying on architectures like transformers, and are trained on vast amounts of text data from diverse sources such as books, articles, websites, and more. Their large size, typically measured in billions of parameters, enables them to capture nuanced language patterns, contextual relationships, and complex syntactic and semantic structures. LLMs are capable of performing a wide range of natural language processing (NLP) tasks, including text generation, translation, summarization, sentiment analysis, question-answering, and even creative writing. They are also adaptive, allowing fine-tuning for domain-specific applications like legal, medical, or technical content. Their scalability and versatility make them a cornerstone of modern AI, enabling innovations in fields like conversational AI, content creation, and decision-making systems. However, their deployment also raises concerns about ethical considerations, bias, and energy consumption, which require careful management.

LLMs pose technical challenges to real-time applications primarily due to their high computational and memory requirements, which can result in significant latency during inference. These models, with their billions of parameters, demand substantial processing power, typically requiring GPUs or TPUs for efficient operation. In real-time applications, such as voice assistants, chatbots, or live translation services, any delay in generating a response can degrade the user experience. The need for rapid processing conflicts with the complexity of LLMs, as their large-scale architecture involves intricate operations across numerous layers and attention mechanisms.

Additionally, the memory bandwidth required to store and access the model weights can further slow down real-time performance. Network latency can also be an issue when LLMs are deployed in a cloud-based environment, as data must travel between the user's device and the server hosting the model. To address these challenges, developers often employ techniques like model quantization, pruning, and distillation to reduce the model size and optimize inference speed. Despite these efforts, maintaining the balance between performance and real-time responsiveness remains a significant hurdle in integrating LLMs into latency-sensitive applications.

SUMMARY

Systems and methods are described herein for novel uses and/or improvements to artificial intelligence applications. As one example, systems and methods are described herein for mitigating the high computational demands and latency of LLM's in real-time application. More particularly, the systems and methods described herein mitigate the high computational demands and latency of LLMs (and/or other network models) in order to support real-time applications across computer networks using a pairwise reranking module.

For example, the pairwise reranking module may comprise an LLM that is augmented with an additional optimization model. While applying an optimization model to the LLM may result in lower latencies, conventional systems avoid this due to the optimization models inherently resulting in lower model performance (e.g., lower accuracy and/or precision) because optimization involves trade-offs between computational efficiency and the LLM's ability to capture complex language patterns. Techniques like quantization, pruning, or knowledge distillation aim to reduce the size and computational requirements of the model by approximating or simplifying certain aspects of its structure. For instance, quantization reduces the precision of numerical computations by representing weights and activations with lower bit depths, which can lead to a loss of fine-grained details learned during training. Pruning removes less significant parameters or connections within the model, potentially discarding some information that contributes to nuanced understanding and generation. Similarly, knowledge distillation transfers knowledge from a larger "teacher" model to a smaller "student" model, often at the cost of losing some of the teacher's performance capabilities. These optimizations inevitably compromise the model's ability to handle edge cases, understand subtle linguistic nuances, or maintain high fidelity in its outputs, especially in complex or diverse tasks.

To maintain the model performance, while still reducing latency, the system further modifies the pairwise reranking module beyond the LLM and the additional optimization model. Specifically, the pairwise reranking module is trained to process specialized prompts and generate specialized outputs. For example, the specialized prompts comprise an aggregation of the network query as well as a pair of network items identified in an initial ranking of network items that were returned in response to the network query. The specialized output on the other hand comprises a single token output.

By handling prompts that include an aggregation of the network query and a pair of network items from an initial ranking, the module narrows its scope to evaluating the relative ranking of just two items at a time. This streamlined process reduces the computational complexity compared to ranking all items in a list simultaneously, enabling faster processing. Generating a specialized single-token output, such as a binary decision (e.g., "better" or "worse") or a ranking score, further minimizes the computational overhead. This is because single-token outputs require less processing and fewer model parameters to interpret compared to generating detailed or multi-token responses. Additionally, the focused nature of pairwise comparisons allows the model to operate efficiently even with limited resources, as it only needs to analyze the relationship between two items in the context of the query, rather than processing the entire dataset or ranking list at once. This targeted approach not only enhances speed and reduces latency but also allows the reranking module to maintain high performance by concentrating its learned expertise on pairwise decisions, which are inherently simpler and more precise than handling a broader ranking task in one step. Accordingly, the systems and methods are particularly well-suited for real-time applications with strict performance requirements.

In some aspects, systems and methods for minimizing latency in network models to facilitate real-time applications. For example, the system may determine, based on a first network query, an initial ranking of a first subset of network items. The system may retrieve a first pair of network items from the first subset of network items. The system may generate a first network prompt based on the first network query and the first pair of network items. The system may input the first network prompt into a pairwise reranking module, wherein the pairwise reranking module is supplemented by a first optimization model. The system may receive a first single token output from the pairwise reranking module. The system may determine a modified ranking of the first subset of network items based on the first single token output. The system may generate for display, on a user interface, a first response to the first network query based on the modified ranking.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of “a,” “an,” and “the” include plural referents unless the context clearly dictates otherwise. In addition, as used in the specification and the claims, the term “or” means “and/or” unless the context clearly dictates otherwise. Additionally, as used in the specification, “a portion” refers to a part of, or the entirety of (i.e., the entire portion), a given item (e.g., data) unless the context clearly dictates otherwise.

BRIEF DESCRIPTION OF THE DRAWINGS

FIG. 2 shows an illustrative table for the benefits of the pairwise reranking module, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
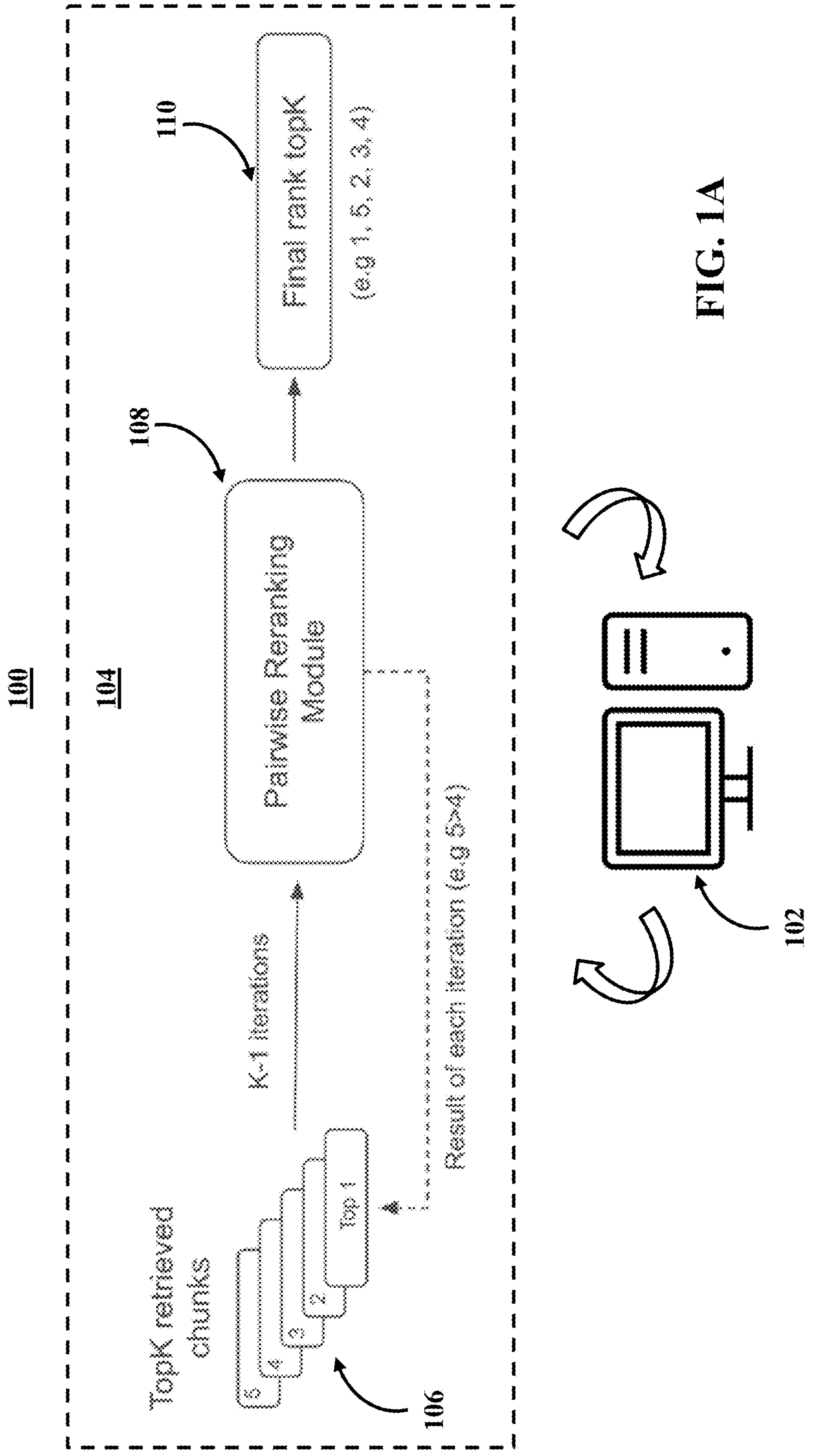
FIG. 1A shows an illustrative diagram for a system design for minimizing latency in computer network modules that service network queries, in accordance with one or more embodiments.

FIG. 1A shows an illustrative diagram for a system design for minimizing latency in computer network modules that service network queries, in accordance with one or more embodiments. For example, FIG. 1A may show system 100. System 100 may minimize latency in computer network modules distributed across one or more cloud computing network locations to facilitate real-time network searching of a cloud computing network.

For example, computer network modules may be distributed across one or more cloud computing network locations and may be referred to as distributed network systems or cloud-based network modules. These components may be strategically deployed across various physical and virtual servers in a cloud infrastructure to optimize scalability, reliability, and real-time performance. They may work collectively to facilitate essential network operations such as data search, communication routing, and data storage. By leveraging the distributed nature of cloud environments, these modules ensure low latency, load balancing, and redundancy, which are critical for real-time operations. For example, a content delivery network (CDN) is a distributed system that caches content in servers located globally to ensure fast content delivery to users based on their geographical proximity. Similarly, distributed databases may store and manage data across multiple cloud locations to provide high availability and quick access for large-scale applications. In routing communications, modules like cloud-based services may dynamically manage domain routing to optimize performance and minimize latency. Furthermore, real-time search engines, when deployed in a cloud-based distributed architecture, enable rapid querying and indexing of large datasets, often used in applications like e-commerce or log management.

System 100 may comprise user interface 102. As referred to herein, a “user interface” may comprise a human-computer interaction and communication in a device, and may include display screens, keyboards, a mouse, and the appearance of a desktop. For example, a user interface may comprise a way a user interacts with an application or a website.

As referred to herein, “content” should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

The system may monitor content generated by the user to generate user profile data. As referred to herein, “a user profile” and/or “user profile data” may comprise data actively and/or passively collected about a user. For example, the user profile data may comprise content generated by the user and a user characteristic for the user. A user profile may be content consumed and/or created by a user.

User profile data may also include a user characteristic. As referred to herein, “a user characteristic” may include information about a user and/or information included in a directory of stored user settings, preferences, and information for the user. For example, a user profile may have the settings for the user’s installed programs and operating system. In some embodiments, the user profile may be a visual display of personal data associated with a specific user, or a customized desktop environment. In some embodiments, the user profile may be digital representation of a person’s identity. The data in the user profile may be generated based on the system actively or passively monitoring.

User interface 102 may access system 104, which may comprise a pairwise reranking module for performing network operations. For example, user interface 102 may access system 104 to receive, from a first network location across a computer network, a first network query, wherein the first network query routes a network search function to one or more databases at a second network location and determine, based on the first network query, a first subset of network items responsive to the first network query based on applying the network search function to the one or more databases.

A network location may refer to a specific point or resource within a computer network where data, services, or devices are hosted or accessed. It can represent physical hardware, such as a server or storage device, or virtual resources like cloud-based instances, databases, or application endpoints. Network locations are identified by unique network addresses, such as IP addresses, domain names, or URLs, which enable systems and users to interact with them across the network.

For example, in a cloud computing environment, a network location might be a virtual machine in a data center or a storage bucket in a specific geographic region. Similarly, in a local network, a network location could refer to a shared printer, a file server, or a workstation. The concept is foundational to network communication, as it allows data to be routed and services to be accessed efficiently. Network locations can be static, with fixed addresses, or dynamic, where addresses change based on system configurations or demand. In distributed systems, multiple network locations often work together to ensure scalability, redundancy, and load balancing for seamless user experiences.

System 104 receives a first network query from a first network location across a computer network operates by leveraging a distributed architecture to process and respond to the query efficiently. A network query may be a structured request sent across a computer network to retrieve, manipulate, or analyze data stored in remote databases, systems, or devices. It serves as a command or question that defines specific parameters or criteria for the desired information. Network queries are used to locate resources, search for relevant data, or execute operations within distributed systems. They are essential in modern computing environments where data and resources are often spread across multiple network locations, such as in cloud computing, content delivery networks, and enterprise systems.

For instance, a network query might request user details from a central database, fetch specific files from cloud storage, or execute a search on an e-commerce platform for products matching particular criteria. Queries can range from simple HTTP requests for web pages to more complex SQL-like queries used in relational or distributed databases. They often include components such as filters, keywords, and routing information to guide the system in locating and processing the requested data. Efficient handling of network queries is critical for ensuring fast, accurate, and secure communication in both small-scale and large-scale networked environments.

Upon receiving the query, the system identifies the nature of the network search function encoded in the request. This function is designed to specify parameters, such as keywords, data attributes, or relational patterns, that guide the search operation. The system then routes the query to one or more databases at a second network location, which may involve selecting the most appropriate databases based on factors such as query parameters, database content, and geographical proximity to minimize latency.

At the second network location, the system applies the network search function to the selected databases. This process often involves querying indexed data structures or leveraging advanced search algorithms optimized for speed and relevance. The system evaluates the database contents against the query's criteria to determine a first subset of network items that match or fulfill the specified conditions. This subset, representing the initial set of results, is then prepared for transmission back to the originating network location or further processing, such as ranking or filtering.

System 104 retrieves a Top K set of network items or "chunks" (e.g., network items 106) by executing a network query against one or more databases or data repositories to identify the most relevant items based on predefined ranking criteria. The system employs a ranking mechanism to generate an initial ordered list of items, selecting the Top K items that best match the query parameters. This selection process might involve algorithms optimized for relevance scoring, such as cosine similarity, machine learning models, or heuristic-based ranking techniques.

Once the Top K items are identified, they are submitted to a pairwise reranking module (e.g., pairwise reranking module 108) for further refinement. The pairwise reranking module systematically compares pairs of items from the initial set, evaluating their relative relevance or importance using more granular criteria or complex ranking algorithms. This iterative process may involve reranking the items by incorporating additional features, such as contextual relevance, user preferences, or specific query constraints.

The reranking module continues iterating through these pairwise comparisons, progressively refining the rankings to resolve ties or improve the precision of the ordered list. This process ensures that the final output—a top-ranked set of network items (e.g., items 110)—represents the most relevant and accurate results for the query. The iterative nature of the module allows for dynamic adjustments, accommodating complex ranking requirements or evolving data contexts. This approach is commonly used in advanced search engines, recommendation systems, and information retrieval frameworks to deliver highly relevant results to users.

For example, to determine an initial ranking of a first subset of network items, system 104 evaluates the items based on predefined criteria, such as relevance scores, metadata, or contextual alignment with a first network query. This initial ranking serves as the starting point for further optimization. System 104 then performs iterative reranking on the subset to refine the order of the items and improve their relevance to the query. This process begins by retrieving a first pair of network items from the subset and generating a network prompt that contextualizes the pair within the framework of the original query. The prompt is designed to provide the necessary context for a pairwise evaluation of the items, incorporating information about the query and specific attributes of the items under comparison.

The generated prompt is then input into pairwise reranking module 108, a specialized model trained to produce single-token outputs that indicate the relative ranking of the pair (e.g., which item is more relevant or better suited to the query). This module operates using a combination of learned ranking techniques and decision-making processes, often enhanced by supplementary components such as a first optimization model. The optimization model fine-tunes the pairwise comparisons by incorporating additional data signals or applying domain-specific heuristics, ensuring that the reranking results align with the system's performance objectives.

Through iterative comparisons of pairs of items, the reranking module systematically refines the ranking of the subset, resolving conflicts and improving overall precision. Once the modified ranking is finalized, the system generates a response to the original query, prioritizing the most relevant items based on the updated order. This response is then displayed on a user interface (e.g., user interface 102), ensuring that the user receives the most accurate and contextually appropriate results. This approach is commonly employed in advanced search engines, recommendation systems, and decision-support tools to enhance user experience and query satisfaction.

Figure 1B:
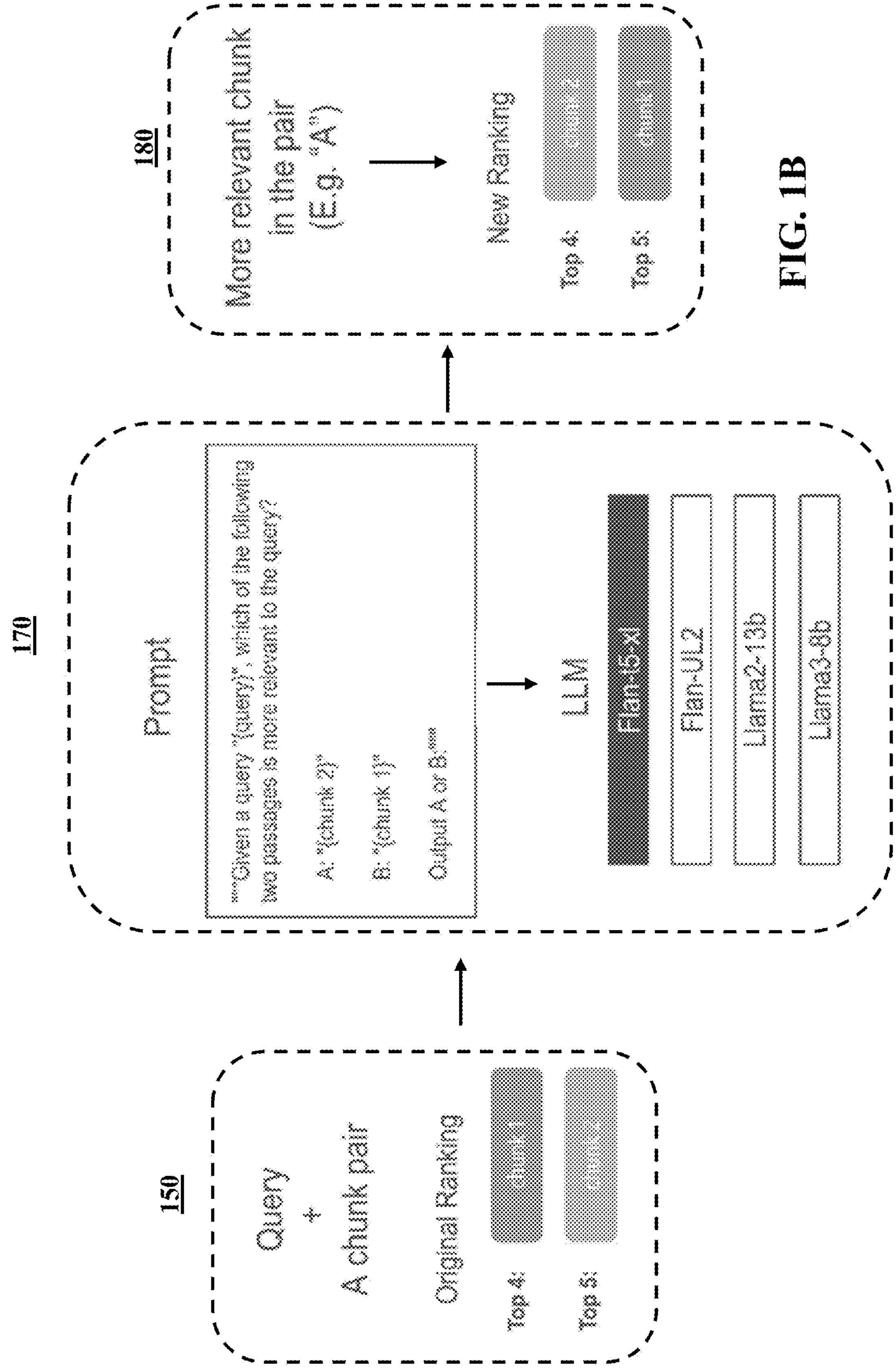
FIG. 1B shows an illustrative diagram for a pairwise reranking module, in accordance with one or more embodiments.

FIG. 1B shows an illustrative diagram for a pairwise reranking module, in accordance with one or more embodiments. For example, FIG. 1B may show input 150, module 170, and output 180.

Input 150 may illustrate an initial query and its combination with a first pair of network items (e.g., "chunks"). For example, the system retrieves a first pair of network items from an initial ranking of network items, wherein the initial ranking is based on a network query. For example, input 150 illustrates an initial query and its combination with a first pair of network items by integrating the user's query with relevant contextual information derived from the pair of items. The system begins by processing the initial network query to identify its key components, such as keywords, intent, or specific data requirements. Using this processed query, the system retrieves a first pair of network items (e.g., "chunks") from an initial ranking, where the ranking is determined based on the relevance of the network items to the query. The initial ranking might utilize scoring algorithms or similarity measures to prioritize the items.

To illustrate the combination, input 150 encapsulates the initial query alongside metadata or content from the first pair of network items. For example, the system may construct a structured prompt or context block that juxtaposes the query with the details of the two items, such as their textual content, attributes, or relevance scores. This structured input enables downstream modules, such as a pairwise reranking module, to evaluate the pair's suitability in relation to the query.

The combination process ensures that the query's intent and the pair's contextual details are aligned, providing a comprehensive input for further processing. This approach is particularly effective in systems that rely on iterative refinement, as it allows for dynamic adjustments to the ranking based on pairwise comparisons and the evolving context of the query. Through this mechanism, the system achieves a more nuanced and accurate response to the initial query.

Module 170 may illustrate a prompt being generated for an LLM that is being optimized by a supplemental model. For example, the system may generate a first textual representation of the network query. The system may generate a second textual representation of the first pair of network items. The system may generate a network prompt for a pairwise reranking module based on aggregating the first textual representation and the second textual representation. The system may then input the network prompt into the pairwise reranking module. Module 170 illustrates the process of generating a prompt for a large language model (LLM) that is being optimized by a supplemental model by combining query and context representations into a cohesive input format. The system begins by generating a first textual representation of the network query, capturing the key intent, parameters, and scope of the user's request. This representation distills the essential aspects of the query into a form that the LLM can effectively interpret. Simultaneously, the system generates a second textual representation of the first pair of network items, which includes their content, attributes, or any metadata relevant to the comparison or evaluation in the context of the query.

Next, the system aggregates the first and second textual representations to form a network prompt. This prompt is a structured input designed to provide the pairwise reranking module with both the original query context and detailed information about the network items under comparison. The prompt may include specific instructions, comparison criteria, or relational cues to guide the LLM in generating outputs that are relevant to the reranking task. For example, the prompt might be structured as: "Given the query 'Find the most relevant research paper on AI,' compare the following two items and determine which is more relevant: A: [content] B: [content]."

The generated prompt is then input into the pairwise reranking module, which leverages the LLM's advanced natural language understanding capabilities. The module, enhanced by a supplemental optimization model, processes the prompt and produces a single-token output or ranking decision that reflects the relative priority or relevance of the pair of items. The supplemental model plays a key role in optimizing the LLM's performance by incorporating additional data signals, fine-tuning ranking criteria, or aligning outputs with specific domain requirements. This iterative process ensures that the LLM provides highly accurate and contextually relevant reranking outputs, ultimately refining the ranking of network items to meet the user's query intent.

Output 180 may illustrate the most relevant network items following the reranking. For example, the system may receive a token output from the pairwise reranking module and determine a modified ranking of the network items based on the token output. Output 180 illustrates the most relevant network items following the reranking process by presenting a refined and optimized ranking that aligns closely with the query's intent. The system achieves this by interpreting the token output generated by the pairwise reranking module. Each token output represents a decision or preference indicating which of the two compared network items is more relevant or better suited to the query context. These token outputs are iteratively generated for all pairs of items in the initial subset, enabling the system to reassess and reorder the items based on the cumulative reranking results.

Using the token outputs, the system determines a modified ranking of the network items by aggregating the pairwise comparisons into a cohesive order. Advanced algorithms or scoring mechanisms may be used to reconcile conflicting preferences and ensure consistency in the final ranking. The modified ranking reflects the updated prioritization, taking into account additional contextual factors or refined evaluation criteria introduced during the reranking process.

The most relevant network items, as determined by this modified ranking, are then included in output 180, which can be formatted for display or further use. For example, in a search engine interface, the top-ranked items may appear as the final results presented to the user. This iterative approach ensures that the system not only identifies relevant items initially but also refines their order to maximize accuracy, relevance, and user satisfaction based on a thorough evaluation.

FIG. 2 shows an illustrative diagram for a pairwise reranking module, in accordance with one or more embodiments. For example, FIG. 2 includes table 200. Table 200 illustrates the benefits of a pairwise reranking module by demonstrating how it enhances system performance while balancing critical factors such as optimization models, result quality, recall levels, and latency. Each column in the table provides specific insights into how the module contributes to improving the efficiency and usability of the system. For example, one column may list various optimization models used to supplement the LLM, such as fine-tuned models or lightweight algorithms designed to reduce computational overhead. These models are key to maintaining the LLM's ability to perform complex pairwise comparisons without incurring significant performance costs.

Another column in the table might show the number of Top K results produced by the system after reranking. This highlights the effectiveness of the module in refining initial rankings to identify the most relevant results, demonstrating its ability to maintain high precision and relevance. The table may also include columns detailing different recall levels, which measure how well the system retrieves all relevant items in the dataset. High recall levels achieved with the reranking module indicate that the module supports comprehensive query resolution.

Finally, the table includes a column showing the latency associated with the reranking process. By comparing latency across different configurations, the table highlights how the pairwise reranking module mitigates the high computational demands typically associated with LLMs, making it suitable for real-time applications across computer networks. Importantly, the table might indicate that this optimization occurs without any noticeable performance loss in terms of result quality or relevance. This balance of efficiency and effectiveness demonstrates the module's ability to deliver rapid, accurate responses, ensuring its utility in time-sensitive and large-scale network environments.

Figure 3:
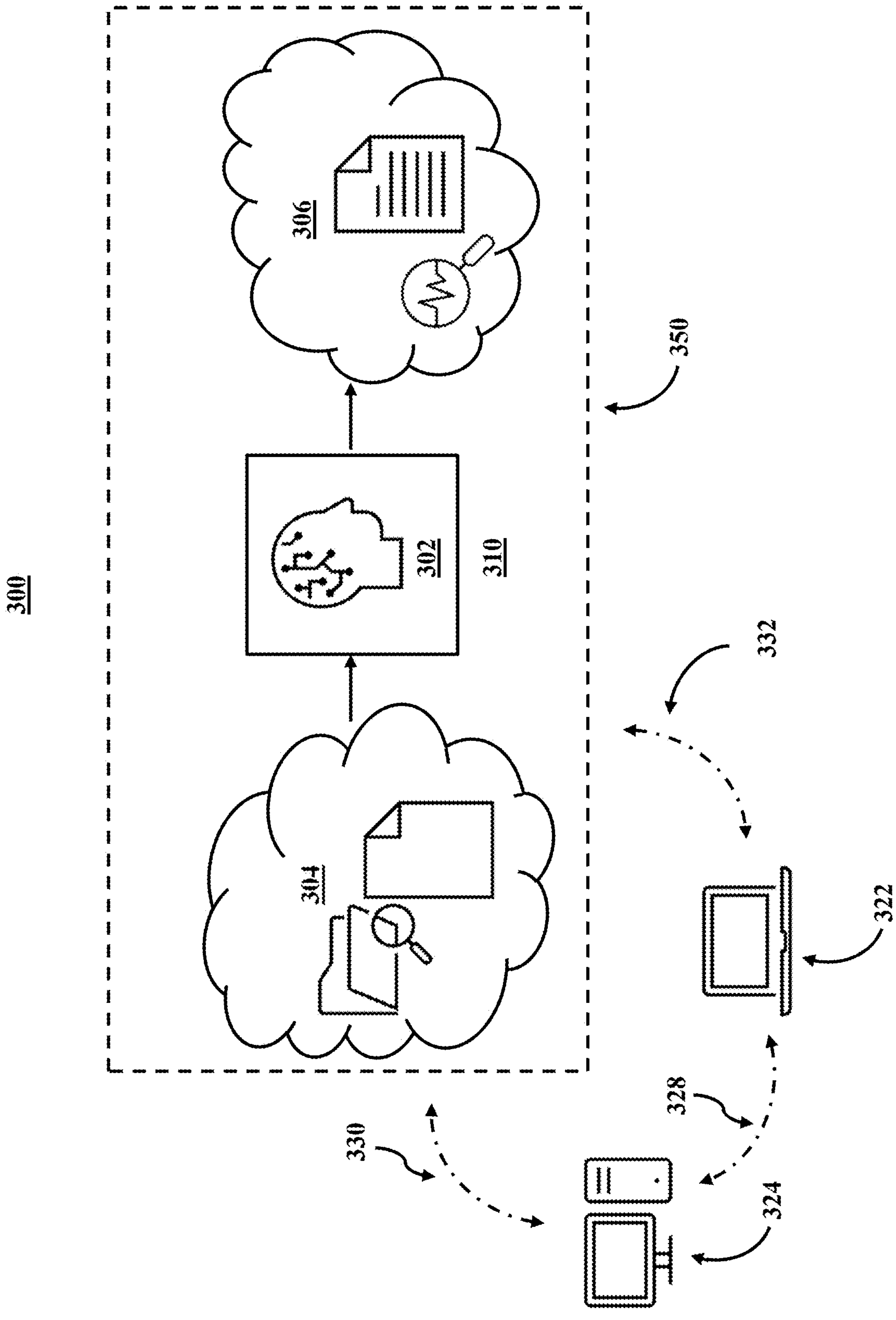
FIG. 3 shows illustrative components for a system used to facilitate a pairwise reranking, in accordance with one or more embodiments.

FIG. 3 shows illustrative components for a system used to facilitate a pairwise reranking, in accordance with one or more embodiments. For example, FIG. 3 may show illustrative components for minimizing latency in network models to facilitate real-time applications. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

In some embodiments, system 300 and/or one or more models herein may be implemented using an application specific integrated circuit. An integrated circuit may be a small electronic device made of semiconductor material, typically silicon, that contains a large number of microscopic electronic components such as transistors, resistors, capacitors, and diodes. These components are interconnected to perform a specific function or set of functions. Integrated circuits can be classified into various types based on their functionality, such as analog, digital, and mixed-signal ICs. The transistors within an IC are the primary building blocks, as they act as switches or amplifiers for electronic signals. The other components, like resistors and capacitors, are used for controlling voltage, current, and timing within the circuit. System 300 may design the integrated circuit to be application specific such that design of the circuit is customized for a given application. In some embodiments, system 300 may use an integrated circuit system where one or more integrated circuit are spread throughout a system, network, and/or one or more devices. In such case, the system design may ensure that the circuits are integrated with other electronic components like connectors, power supplies, and sensors to form a complete and functional electronic system. This integration allows for the implementation of sophisticated tasks in devices needed for one or more specified applications.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results.

Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a rank score, a generated prompt, a subset of network items).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., minimizing latency in network models to facilitate real-time applications).

In some embodiments, the model (e.g., model 302) may automatically perform actions based on outputs 306. In some embodiments, the model (e.g., model 302) may not perform any actions. The output of the model (e.g., model 302) may be used to minimize latency in network models to facilitate real-time applications.

In some embodiments, the system may generate predictions related to financial services. For example, the system may use one or more models and/or application to process a variety of data to generate predictions for tasks such as payment card eligibility determinations, fraud detection, and/or determining rates for auto-finance applications. For credit card eligibility, the model may use data such as the applicant's credit score, income, employment history, debt-to-income ratio, and past credit history. This data helps the model predict the likelihood of the applicant repaying the credit card debt. For fraud detection, models analyze transaction data, including the amount, location, frequency, and pattern of transactions. They compare these patterns to known fraudulent behavior to identify potentially fraudulent activities. For determining auto-finance rates, models might use the applicant's credit score, loan amount, loan term, vehicle details, and market interest rates. The data used by these models comes from various sources, including credit bureaus, financial institutions, customer-provided information, transaction records, and public records. By analyzing these data points, models can make informed predictions and decisions that help financial institutions manage risk, provide appropriate services, and enhance customer satisfaction.

In some embodiments, the model may process received data through several stages. For example, the model may collect and aggregate data from various sources (e.g., a user account, industry data, third-party data sources, etc.). The system may ensure the data is cleaned and preprocessed to handle any missing and/or inconsistent information. This preprocessing may include normalizing numerical data, encoding categorical variables, and applying techniques to handle outliers. The model may then use feature engineering to identify and create relevant features that can improve its predictive power. For instance, the system may derive new variables from existing ones, such as calculating the debt-to-income ratio from debt and income data.

Once the data is prepared, the system feeds the data into the model, which could be an artificial intelligence algorithm such as logistic regression, decision trees, and/or neural networks. The model may be trained on historical data, learning patterns, and/or relationships between input features and the target outcomes. During this training process, the system may adjust the model parameters to minimize prediction errors. After training, the system may validate the model and test the model using separate data sets to ensure the model has a predetermined and/or threshold accuracy and generalizability.

In some embodiments, the system may use specialized predictions based on the task. Additionally or alternatively, the system may adjust the inputs and/or outputs based on the determinations and/or predictions required. For example, for credit card eligibility, the model may evaluate the applicant's likelihood of defaulting on payments. In fraud detection, the model may identify anomalies and patterns indicative of fraudulent behavior. In auto-finance rate determination, the model may predict the risk associated with lending to an individual and adjusts the interest rates accordingly. In some embodiments, the entire process may be iterative, with models continually updated and refined as new data becomes available, ensuring they remain effective in making accurate and reliable predictions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
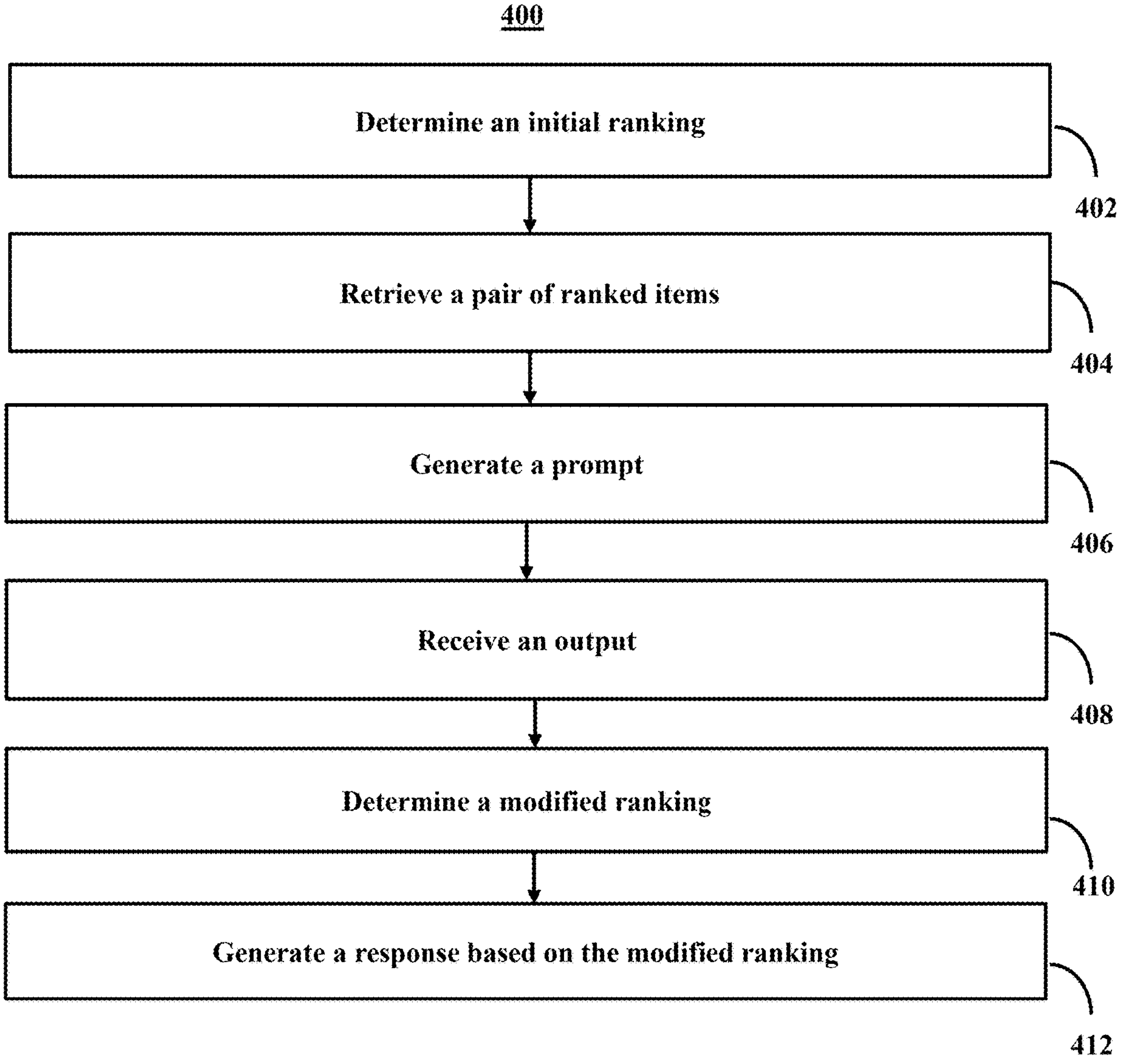
FIG. 4 shows a flowchart of the steps involved in minimizing latency in network models to facilitate real-time applications, in accordance with one or more embodiments.

FIG. 4 shows a flowchart of the steps involved in minimizing latency in network models to facilitate real-time applications, in accordance with one or more embodiments. For example, the system may use process 400 (e.g., as implemented on one or more system components described above) in order to minimize latency in computer network modules distributed across one or more cloud computing network locations to facilitate real-time network searching of a cloud computing network.

At step 402, process 400 (e.g., using one or more components described above) determines an initial ranking. For example, the system may determine, based on a first network query, an initial ranking of a first subset of network items. A system determines an initial ranking of a first subset of network items based on a first network query by evaluating the relevance of the items against the query's parameters using predefined ranking criteria or algorithms. When the query is received, the system parses its content to identify key components such as keywords, filters, or semantic intent. These components are then matched against the attributes of network items stored in one or more databases or repositories. The matching process may involve techniques like text-based similarity scoring, metadata comparisons, or advanced machine learning models trained to predict relevance. Once the relevance of each item is calculated, the system generates an initial ranking by sorting the items based on their scores or priority values. For example, items that have higher semantic similarity to the query, or that meet specific query filters (e.g., date ranges, category tags), are ranked higher. This initial ranking acts as a prioritized subset of items that are most likely to fulfill the query's intent. The system might also use heuristics, such as recency or popularity, to further refine the ranking in the context of the query. This initial ranking is crucial as it serves as the foundation for subsequent processing, such as iterative reranking or user interface presentation. By effectively narrowing down the larger dataset into a smaller, focused subset of highly relevant items, the system ensures that further computational resources are applied efficiently, enabling faster and more accurate responses to the network query.

In some embodiments, the system may determine, based on the first network query, the initial ranking by determining, based on the first network query, a first search criterion, determining, based on the first network query, one or more databases at a network location to search, and applying the first search criterion to the one or more databases to determine the first subset of network items. For example, the system may system determines the initial ranking of network items based on the first network query by employing a systematic process to identify relevant search criteria, locate appropriate databases, and retrieve matching items. First, the system analyzes the content and intent of the network query to extract a first search criterion. This criterion defines the parameters for identifying relevant items, such as keywords, filters, relational attributes, or specific data types. For example, a query like "Find the most recent articles on machine learning" might yield a criterion focused on topics related to machine learning and publication date. Next, the system determines one or more databases at a network location that are most likely to contain the desired information. This step involves identifying repositories that align with the search criterion, such as a specific category of content (e.g., academic publications, user-generated reviews) or a geographic region, if applicable. The system may rely on metadata, database indexes, or preconfigured mappings to efficiently select the relevant databases. With the search criterion and database locations identified, the system applies the criterion to the selected databases. It executes queries against these repositories, filtering and retrieving items that meet the specified parameters. This step leverages search algorithms, indexing techniques, or advanced query systems, such as SQL, NoSQL, or full-text search engines. The result is a first subset of network items, which comprises the most relevant results that match the query's initial intent. Finally, the system generates an initial ranking of the subset by scoring and ordering the items based on factors such as relevance, contextual fit, or user preferences. This initial ranking provides a prioritized list of results, forming the foundation for further refinement through reranking or additional processing. By systematically determining and applying the search criterion, the system ensures that the initial ranking accurately reflects the query's requirements and delivers high-quality results.

In some embodiments, the system may determine, based on the first network query, the initial ranking of the first subset of network items by determining a scoring criterion based on the first network query, determining respective scores for each of a plurality of network items, and determining the initial ranking based on the respective scores. A system determines the initial ranking of a first subset of network items based on a first network query by employing a scoring mechanism that evaluates the relevance of each item in relation to the query. The process begins with the system analyzing the query to derive a scoring criterion that aligns with the query's intent and parameters. This criterion may include factors such as keyword relevance, contextual similarity, metadata attributes (e.g., publication date, category, or location), or domain-specific priorities. For example, a query like "Find the best-rated restaurants in New York" might establish scoring criteria based on customer ratings and geographic proximity to New York. Next, the system evaluates a plurality of network items against the scoring criterion to assign respective scores to each item. These scores quantify how well each item matches the query's requirements, using algorithms such as relevance weighting, cosine similarity, or machine learning-based models trained on historical query data. Additional signals, such as user behavior patterns, popularity metrics, or temporal relevance, may also contribute to the scoring process. Once scores are assigned, the system determines the initial ranking by ordering the network items based on their respective scores. Items with higher scores are ranked higher, reflecting their greater alignment with the query's intent. This ranking provides a prioritized list of the most relevant network items, ensuring that the system delivers results that are both accurate and meaningful. By tailoring the scoring criterion to the specific query and applying it systematically to the available items, the system ensures that the initial ranking effectively captures the user's needs. This initial ranking serves as the basis for further processing, such as iterative reranking or generating a response for display, optimizing both accuracy and efficiency in query resolution.

At step 404, process 400 (e.g., using one or more components described above) retrieves a pair of ranked items. For example, the system may retrieve a first pair of network items from the first subset of network items. The system retrieves a first pair of network items from the first subset of network items by accessing the initial ranking of items determined in response to a network query. The first subset, already prioritized based on relevance or other criteria, serves as a narrowed pool of candidates. To retrieve a pair, the system selects two items from this subset, often based on their relative positions in the ranking. For instance, the system might select the top two ranked items for initial comparison, or it could choose items at specific intervals to optimize the reranking process. The selection process may depend on the specific reranking strategy employed. If the system aims to refine the topmost results quickly, it might prioritize pairs from the highest-ranked items. Alternatively, the system could apply sampling techniques to select pairs that introduce diversity or address edge cases, ensuring a more balanced reranking. The retrieved pair is then packaged along with its associated metadata, such as relevance scores or content details, to prepare it for further processing. By focusing on pairs of items rather than evaluating the entire subset simultaneously, the system enables more precise and granular reranking through pairwise comparison methods. This step is foundational for modules like a pairwise reranking module, which iteratively refines the rankings to ensure that the most relevant items are accurately identified and ordered for the query.

At step 406, process 400 (e.g., using one or more components described above) generates a prompt. For example, the system may generate a first network prompt based on the first network query and the first pair of network items. The system may then input the first network prompt into a pairwise reranking module, wherein the pairwise reranking module is supplemented by a first optimization model. A system generates a first network prompt by combining the first network query with the content and attributes of the first pair of network items into a structured input format designed for pairwise comparison. First, the system processes the network query to extract its key elements, such as intent, filters, or specific keywords. Simultaneously, it retrieves detailed representations of the first pair of network items, including their textual content, metadata, or other relevant features. These representations are structured in a way that highlights their relationship to the query and to each other. The system then aggregates these components into a single network prompt that provides clear instructions or context for the reranking task. For instance, the prompt may include the query followed by a comparative representation of the two items, framed with instructions like: "Based on the query 'Find the best technical report on AI advancements,' compare the following two abstracts and determine which is more relevant: Abstract 1:[content]. Abstract 2:[content]." This structured prompt ensures that the pairwise reranking module receives all necessary information to make an informed decision. Once the network prompt is generated, the system inputs it into the pairwise reranking module, which is specifically designed to evaluate the pair and produce a ranking output. This module is supplemented by a first optimization model, which enhances the reranking process by introducing additional contextual knowledge, domain-specific tuning, or computational efficiency. The optimization model may integrate external data signals, apply learned heuristics, or refine the reranking algorithm to improve accuracy and relevance. The pairwise reranking module processes the prompt and outputs a decision, typically in the form of a single token or score, indicating which item in the pair is more relevant to the query. This output is then used to adjust the overall ranking of the subset, contributing to a refined ordering of network items that aligns with the user's intent.

In some embodiments, the first optimization model supplements the pairwise reranking module by retrieving a parameter for the pairwise reranking module, wherein the parameter corresponds to a required number of outputs and adjusting the parameter to correspond to one. For example, the optimization model supplements the pairwise reranking module by managing its parameters to improve efficiency and relevance in decision-making. One such parameter is the required number of outputs, which determines how many items the reranking module evaluates or prioritizes during its operation. In its default configuration, the parameter might allow the module to consider multiple outputs simultaneously, potentially increasing computational complexity and latency. To enhance performance, the optimization model retrieves this parameter and adjusts it to correspond to a single output. By setting the parameter to one, the optimization model ensures that the pairwise reranking module focuses on generating a single, definitive decision for each pair of network items it evaluates. This adjustment simplifies the reranking process by narrowing the scope of the module's operation, enabling it to generate precise, binary outputs for pairwise comparisons efficiently. This parameter adjustment aligns with the iterative nature of pairwise reranking, where decisions for individual pairs are aggregated to refine the overall ranking of network items. By reducing the required number of outputs to one, the optimization model minimizes computational overhead and streamlines the module's processing pipeline, making it better suited for real-time applications. Additionally, this approach preserves the accuracy and quality of the reranking process, as the module can dedicate its resources to evaluating each pair thoroughly without the added complexity of handling multiple outputs simultaneously.

In some embodiments, the first optimization model supplements the pairwise reranking module by retrieving a threshold number, scoring each of the first subset of network items, sorting each of the first subset of network items based on a respective scoring, and retrieving, based on the respective scoring, a number of items in the first subset of network items corresponding to the threshold number. For example, the optimization model supplements the pairwise reranking module by managing a threshold number to refine the reranking process and prioritize high-value items from the first subset of network items. The optimization model begins by retrieving a predefined threshold number, which represents the desired number of items to focus on during reranking. This threshold helps streamline processing by limiting the scope of the module to a manageable subset of the most relevant items. Next, the optimization model evaluates each item in the first subset by assigning a relevance score based on features such as query alignment, contextual metadata, or learned parameters from prior training. These scores quantify the relative importance or suitability of each item with respect to the network query. Once scoring is complete, the model sorts the items in descending order based on their respective scores, ensuring that the highest-ranking items are positioned at the top of the sorted list. Using the threshold number as a guide, the optimization model retrieves the top-scoring items from the sorted list, corresponding to the threshold value. For example, if the threshold number is 10, the model selects the 10 items with the highest scores. These selected items become the focus of the pairwise reranking module, significantly reducing computational overhead while maintaining high precision in the reranking process. By filtering and prioritizing items based on scoring and a threshold, the optimization model ensures that the pairwise reranking module operates efficiently and effectively. This approach optimizes resource allocation, enabling the system to handle large datasets or complex queries without sacrificing the accuracy or relevance of the final ranking. The integration of a threshold-based selection mechanism allows the system to maintain scalability and responsiveness in real-time network applications.

In some embodiments, the first optimization model supplements the pairwise reranking module by retrieving a number from memory used by the pairwise reranking module and representing the number with a lower precision. For example, the first optimization model supplements the pairwise reranking module by managing memory usage and computational efficiency through precision optimization of numeric representations. The pairwise reranking module often relies on numerical data, such as relevance scores or weight values, stored in memory for processing and decision-making. These numbers are typically represented with high precision (e.g., 32-bit or 64-bit floating-point values) to ensure accuracy during calculations. However, high precision can increase memory usage and computational demands, particularly when processing large datasets or performing complex reranking tasks. To enhance efficiency, the optimization model retrieves these numbers from memory and represents them with a lower precision format, such as converting 64-bit floating-point numbers to 32-bit or even 16-bit formats. This adjustment reduces the amount of memory required to store each number and decreases the computational overhead associated with arithmetic operations. Lower precision formats are sufficient for many tasks, especially when exact precision is not critical to the reranking process. For example, in the context of pairwise comparisons, small differences in precision may not significantly impact the relative ranking of items. By implementing this optimization, the model helps the pairwise reranking module operate more efficiently without compromising its ability to produce accurate results. The reduced memory footprint allows the system to handle larger datasets and scale effectively in real-time applications. Additionally, the decrease in computational complexity can lead to faster processing times, enabling the system to deliver results more promptly while maintaining high relevance and quality. This precision adjustment is a practical trade-off that balances performance and resource utilization in modern reranking systems.

In some embodiments, the first optimization model supplements the pairwise reranking module by retrieving a network item baseline for the first subset of network items and comparing each of the first pair of network items to the network item baseline. For example, the first optimization model supplements the pairwise reranking module by introducing a network item baseline as a reference point for evaluating and comparing the first pair of network items. The baseline represents a benchmark or standard derived from the characteristics of the first subset of network items, such as an average relevance score, a prototypical item profile, or an idealized item that aligns closely with the query's intent. This baseline provides a consistent frame of reference against which the relevance or suitability of individual items can be assessed. To enhance the pairwise reranking process, the optimization model retrieves the network item baseline from memory or computes it dynamically based on the features of the subset. It then compares each item in the first pair of network items to the baseline, evaluating how well they align with the defined benchmark. This comparison may involve scoring metrics, feature similarity calculations, or distance measures, depending on the nature of the baseline and the evaluation criteria. The results of these comparisons are incorporated into the pairwise reranking module's decision-making process. By assessing the relative alignment of each network item to the baseline, the system gains additional context to refine its ranking decisions. For example, if one item in the pair closely matches the baseline while the other deviates significantly, the module can prioritize the former as more relevant to the query. This supplementation by the optimization model enhances the reranking module's precision and consistency. The use of a network item baseline ensures that the comparisons are grounded in a stable, query-relevant context, reducing the risk of bias or misalignment in ranking decisions. It also allows the system to adapt dynamically to different query contexts, improving its ability to deliver accurate and contextually appropriate results.

In some embodiments, the first optimization model supplements the pairwise reranking module by determining a format type for the first network prompt and modifying the first network prompt based on the format type. For example, first optimization model supplements the pairwise reranking module by enhancing the structure and clarity of the input through format type optimization. This process begins by determining the format type most suitable for the first network prompt, which combines the first network query and the first pair of network items. The format type refers to the structure or style of the prompt, designed to maximize the effectiveness of the pairwise reranking module. It may depend on factors such as the complexity of the query, the nature of the network items, and the requirements of the reranking module. The optimization model evaluates the context and characteristics of the input to identify an appropriate format type. For instance, it may select a question-and-answer format, a comparative tabular structure, or a natural language narrative. Once the format type is determined, the model modifies the first network prompt accordingly, restructuring the query and network item details to align with the chosen format. This modification ensures that the prompt is presented in a way that the pairwise reranking module can process efficiently and accurately. For example, if a tabular format is deemed optimal, the model organizes the network items into rows and columns, highlighting attributes that are directly comparable. If a natural language format is preferred, the model might frame the input as: "Given the query 'Find the best data science paper,' compare the following two abstracts and determine which is more relevant: Abstract 1:[content]. Abstract 2:[content]." By tailoring the format, the optimization model improves the module's ability to interpret and evaluate the input. This supplemental process not only enhances the reranking module's precision but also reduces processing time by presenting the information in a structured, predictable way. By aligning the prompt format with the module's strengths, the optimization model ensures more accurate and contextually appropriate reranking outcomes, leading to higher-quality results for the user.

In some embodiments, the first optimization model supplements the pairwise reranking module by determining a size limit for the first network prompt and modifying the first network prompt based on the size limit. For example, the first optimization model supplements the pairwise reranking module by ensuring the efficiency and compatibility of the first network prompt through size optimization. This involves determining an appropriate size limit for the prompt, which includes the first network query and the first pair of network items. The size limit is influenced by factors such as the capacity of the pairwise reranking module, computational constraints, and system latency requirements. For instance, large prompts may slow down processing or exceed the input size limits of the underlying reranking algorithms or language models. To address this, the optimization model first retrieves the size limit, either as a predefined system constraint or dynamically calculated based on the current load and resource availability. Once the limit is determined, the model evaluates the initial network prompt to ensure it complies with the size restriction. If the prompt exceeds the limit, the optimization model modifies it by truncating or summarizing less critical information while retaining the key components needed for accurate reranking. For example, the model might condense lengthy descriptions of the network items, focus on the most relevant attributes, or simplify the phrasing of the network query. It could also use techniques such as token reduction, summarization algorithms, or context prioritization to ensure the prompt remains concise yet informative. The modified prompt is then reformatted to fit within the size limit, maintaining clarity and relevance. By managing prompt size, the optimization model ensures that the pairwise reranking module can process the input efficiently without errors or delays caused by overly large inputs. This adjustment not only enhances the system's performance but also preserves the accuracy and contextual integrity of the reranking process, enabling the system to deliver high-quality results in real-time applications.

In some embodiments, the first optimization model supplements the pairwise reranking module by determining a batch limit for the first network prompt and modifying the first network prompt based on the batch limit. The first optimization model supplements the pairwise reranking module by optimizing input management through batch processing limits. A batch limit refers to the maximum number of network prompts or comparisons that the pairwise reranking module can process simultaneously. This limit is determined by factors such as the module's computational capacity, memory usage, and system performance requirements. Handling prompts in appropriately sized batches ensures that the module operates efficiently without overloading resources or introducing latency. To implement this, the optimization model retrieves the batch limit as a predefined system parameter or calculates it dynamically based on current system conditions, such as workload or available computational resources. Once the batch limit is established, the model assesses the incoming first network prompt and the associated pairwise comparisons to ensure they fit within the limit. If the total number of comparisons or prompts exceeds the batch limit, the model divides the input into smaller, manageable batches. During this process, the optimization model modifies the first network prompt as needed to align with the batch constraints. This might involve splitting a large prompt into multiple sub-prompts, grouping comparisons strategically, or prioritizing the most relevant comparisons for inclusion in the initial batch. The model ensures that each batch remains coherent and contextually meaningful, preserving the integrity of the reranking process. By enforcing the batch limit, the optimization model prevents performance bottlenecks and ensures that the pairwise reranking module processes inputs efficiently. This approach allows the system to scale effectively, handle large datasets, and maintain responsiveness, even under heavy workloads. The batch optimization process balances the need for thorough reranking with the practical constraints of real-time system performance, resulting in accurate and timely outputs.

At step 408, process 400 (e.g., using one or more components described above) receives an output. For example, the system may receive a first single token output from the pairwise reranking module. A system receives a first single token output from the pairwise reranking module as the result of the module processing a network prompt. After generating and inputting the prompt, which includes the original network query and the first pair of network items, the reranking module evaluates the pair using its trained algorithms and supplemental optimization model. The module compares the two items based on the query's context and the provided information, assessing their relative relevance or suitability. The evaluation results in a single token output, such as a numerical score, a binary value, or a specific identifier, which represents the module's decision about the pair. For instance, the token might indicate which item is more relevant by assigning a "1" to the first item and a "0" to the second, or vice versa. Alternatively, it might output a score that quantifies the strength of preference for one item over the other. This single token output is transmitted back to the system, which integrates it into the larger reranking process. The token serves as an input for refining the overall ranking of the network items by either directly reordering the pair or contributing to an aggregated scoring mechanism that influences the final ranking. The use of a single token ensures efficient communication and processing, allowing the system to handle multiple iterations of pairwise comparisons swiftly and accurately.

In some embodiments, the system receives the first single token output from the pairwise reranking module by receiving a binary determination from the pairwise reranking module and generating the first single token output based on the binary determination. The system A system receives the first single token output from the pairwise reranking module by leveraging the binary determination provided by the module to make a straightforward relevance decision. After inputting a network prompt that includes the first network query and a pair of network items, the pairwise reranking module evaluates the pair to determine which item is more relevant to the query. This evaluation results in a binary determination, such as assigning a "1" if the first item is more relevant and a "0" if the second item is more relevant (or vice versa). The system then processes this binary determination to generate the single token output. This token encapsulates the reranking decision in a compact, interpretable format that the system can efficiently use in downstream processes. For example, if the binary determination is "1," indicating a preference for the first item, the system assigns this value as the single token output. Similarly, if the module outputs "0," the system directly translates this as the token indicating the second item is preferred. This single token output serves as an input for updating the rankings of the network items. By integrating the binary determinations from multiple pairwise comparisons, the system iteratively refines the overall ranking of the subset, ensuring that the most relevant items are prioritized. This process enables the system to efficiently process and apply the pairwise reranking results, maintaining high performance and accuracy in generating responses to network queries.

At step 410, process 400 (e.g., using one or more components described above) determines a modified ranking. For example, the system may determine a modified ranking of the first subset of network items based on the first single token output. For example, using this information, the system updates the rankings within the subset. If the token output specifies a direct preference (e.g., a binary indicator where "1" means the first item is more relevant), the system reorders the items accordingly. If the token provides a score or weighted value, the system may use this as input to an aggregation mechanism, such as summing scores across multiple pairwise comparisons or updating a ranking model that recalculates positions based on cumulative preferences. The system repeats this process iteratively for other pairs of items within the subset, incorporating the outputs from additional pairwise comparisons. As more tokens are processed, the system refines the ranking further, resolving conflicts and optimizing the order of items to align with the query's intent. This iterative approach ensures that the final modified ranking reflects the most accurate and contextually relevant ordering of the items in the subset. The modified ranking is then used to generate a response to the original network query, ensuring that the system delivers results that are both precise and prioritized according to the user's needs. This method allows the system to leverage the granularity of pairwise reranking while efficiently integrating the results into a comprehensive ranking structure.

At step 412, process 400 (e.g., using one or more components described above) generates a response based on the modified ranking. For example, the system may generate for display, on a user interface, a first response to the first network query based on the modified ranking. The system generates a first response to the first network query for display on a user interface by leveraging the modified ranking of the first subset of network items. Once the modified ranking has been determined through iterative pairwise comparisons and reranking, the system identifies the highest-priority items that best align with the query's intent. These top-ranked items are selected as the basis for the response, ensuring that the user receives the most relevant and contextually appropriate results. To prepare the response, the system formats the selected items in a manner suitable for the user interface. This formatting may include organizing the items into a list, grid, or other visual structure, accompanied by metadata such as titles, summaries, images, or links. The system ensures that the presentation is clear and intuitive, highlighting key attributes of the items that match the query's parameters. For example, in a search engine, the response might include clickable titles, brief descriptions, and URLs for the top results. The system then sends the formatted response to the user interface for rendering. This process may involve additional customization based on user preferences, device type, or interface constraints, such as tailoring the layout for a mobile app versus a desktop application. The final display provides the user with an interactive and visually accessible representation of the query results, allowing them to explore the retrieved items efficiently. By basing the response on the modified ranking, the system ensures that the displayed results reflect the highest relevance and quality, enhancing the overall user experience.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for minimizing latency in network models to facilitate real-time applications.
2. The method of the preceding embodiment, further comprising: determining, based on a first network query, an initial ranking of a first subset of network items; retrieving a first pair of network items from the first subset of network items; generating a first network prompt based on the first network query and the first pair of network items; inputting the first network prompt into a pairwise reranking module, wherein the pairwise reranking module is supplemented by a first optimization model; receiving a first single token output from the pairwise reranking module; determining a modified ranking of the first subset of network items based on the first single token output; and generating for display, on a user interface, a first response to the first network query based on the modified ranking.
3. The method of any one of the preceding embodiments, wherein receiving the first single token output from the pairwise reranking module further comprises: receiving a binary determination from the pairwise reranking module; and generating the first single token output based on the binary determination.
4. The method of any one of the preceding embodiments, wherein the first optimization model supplements the pairwise reranking module by: retrieving a parameter for the pairwise reranking module, wherein the parameter corresponds to a required number of outputs; and adjusting the parameter to correspond to one.
5. The method of any one of the preceding embodiments, wherein the first optimization model supplements the pairwise reranking module by: retrieving a threshold number; scoring each of the first subset of network items; sorting each of the first subset of network items based on a respective scoring; and retrieving, based on the respective scoring, a number of items in the first subset of network items corresponding to the threshold number.
6. The method of any one of the preceding embodiments, wherein the first optimization model supplements the pairwise reranking module by: retrieving a number from memory used by the pairwise reranking module; and representing the number with a lower precision.
7. The method of any one of the preceding embodiments, wherein the first optimization model supplements the pairwise reranking module by: retrieving a number from memory used by the pairwise reranking module; and representing the number with a lower precision.
8. The method of any one of the preceding embodiments, wherein the first optimization model supplements the pairwise reranking module by: determining a size of the pairwise reranking module; determining a threshold model size; and comparing the size to the threshold model size.
9. The method of any one of the preceding embodiments, wherein the first optimization model supplements the pairwise reranking module by: retrieving a network item baseline for the first subset of network items; and comparing each of the first pair of network items to the network item baseline.
10. The method of any one of the preceding embodiments, wherein the first optimization model supplements the pairwise reranking module by: determining a format type for the first network prompt; and modifying the first network prompt based on the format type.
11. The method of any one of the preceding embodiments, wherein the first optimization model supplements the pairwise reranking module by: determining a size limit for the first network prompt; and modifying the first network prompt based on the size limit.
12. The method of any one of the preceding embodiments, wherein the first optimization model supplements the pairwise reranking module by: determining a batch limit for the first network prompt; and modifying the first network prompt based on the batch limit.
13. The method of any one of the preceding embodiments, wherein determining, based on the first network query, the initial ranking further comprises: determining, based on the first network query, a first search criterion; determining, based on the first network query, one or more databases at a network location to search; and applying the first search criterion to the one or more databases to determine the first subset of network items.

14. The method of any one of the preceding embodiments, wherein generating the first network prompt based on the first pair and the first network query further comprises: generating a first textual representation of the first network query; generating a second textual representation of the first pair; and determining the first network prompt based on the first textual representation and the second textual representation.

15. The method of any one of the preceding embodiments, wherein determining, based on the first network query, the initial ranking of the first subset of network items further comprises: determining a scoring criterion based on the first network query; determining respective scores for each of a plurality of network items; and determining the initial ranking based on the respective scores.

16. One or more non-transitory, computer-readable mediums storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A system for minimizing latency in computer network modules distributed across one or more cloud computing network locations to facilitate real-time network searching of a cloud computing network, the system comprising:

one or more processors; and one or more non-transitory, computer-readable mediums comprising instructions that when executed by the one or more processors cause operations comprising:

receiving, from a first network location across a computer network, a first network query, wherein the first network query routes a network search function to one or more databases at a second network location;

determining, based on the first network query, a first subset of network items responsive to the first network query based on applying the network search function to the one or more databases;

determining an initial ranking of the first subset of network items;

determining, based on an iterative reranking of network items in the first subset of network items, a modified ranking of the first subset of network items by:

retrieving a first pair of network items from the first subset of network items;

generating a network prompt based on the first pair and the first network query; and inputting the network prompt into a pairwise reranking module to determine a first single token output, wherein the pairwise reranking module is trained to generate outputs based on generated prompts, and wherein the pairwise reranking module is supplemented by a first optimization model that:

retrieves a parameter for the pairwise reranking module, wherein the parameter corresponds to a required number of outputs; and adjusts the parameter to correspond to one; and generating for display, on a user interface, a first response to the first network query based on the modified ranking.

2. A method for minimizing latency in network models to facilitate real-time applications, the method comprising:

determining, based on a first network query, an initial ranking of a first subset of network items;

retrieving a first pair of network items from the first subset of network items;

generating a first network prompt based on the first network query and the first pair of network items;

inputting the first network prompt into a pairwise reranking module, wherein the pairwise reranking module is supplemented by a first optimization model that:

retrieves a parameter for the pairwise reranking module, wherein the parameter corresponds to a required number of outputs; and adjusts the parameter to correspond to one;

receiving a first single token output from the pairwise reranking module;

determining a modified ranking of the first subset of network items based on the first single token output; and generating for display, on a user interface, a first response to the first network query based on the modified ranking.

3. The method of claim 2, wherein receiving the first single token output from the pairwise reranking module further comprises:

receiving a binary determination from the pairwise reranking module; and generating the first single token output based on the binary determination.

4. The method of claim 2, wherein the first optimization model supplements the pairwise reranking module by:

retrieving a threshold number;

scoring each of the first subset of network items;

sorting each of the first subset of network items based on a respective scoring; and retrieving, based on the respective scoring, a number of items in the first subset of network items corresponding to the threshold number.

5. The method of claim 2, wherein the first optimization model supplements the pairwise reranking module by:

retrieving a number from memory used by the pairwise reranking module; and representing the number with a lower precision.

6. The method of claim 2, wherein the first optimization model supplements the pairwise reranking module by:

determining a size of the pairwise reranking module;

determining a threshold model size; and comparing the size to the threshold model size.

7. The method of claim 2, wherein the first optimization model supplements the pairwise reranking module by:

retrieving a network item baseline for the first subset of network items; and comparing each of the first pair of network items to the network item baseline.

8. The method of claim 2, wherein the first optimization model supplements the pairwise reranking module by:

determining a format type for the first network prompt; and modifying the first network prompt based on the format type.

9. The method of claim 2, wherein the first optimization model supplements the pairwise reranking module by:

determining a size limit for the first network prompt; and modifying the first network prompt based on the size limit.

10. The method of claim 2, wherein the first optimization model supplements the pairwise reranking module by:

determining a batch limit for the first network prompt; and modifying the first network prompt based on the batch limit.

11. The method of claim 2, wherein determining, based on the first network query, the initial ranking further comprises:

determining, based on the first network query, a first search criterion;

determining, based on the first network query, one or more databases at a network location to search; and applying the first search criterion to the one or more databases to determine the first subset of network items.

12. The method of claim 2, wherein generating the first network prompt based on the first pair and the first network query further comprises:

generating a first textual representation of the first network query;

generating a second textual representation of the first pair; and determining the first network prompt based on the first textual representation and the second textual representation.

13. The method of claim 2, wherein determining, based on the first network query, the initial ranking of the first subset of network items further comprises:

determining a scoring criterion based on the first network query;

determining respective scores for each of a plurality of network items; and determining the initial ranking based on the respective scores.

14. One or more non-transitory, computer-readable mediums, comprising instructions that, when executed by one or more processors, cause operations comprising:

retrieving a first pair of network items from an initial ranking of network items, wherein the initial ranking is based on a network query;

generating a first textual representation of the network query;

generating a second textual representation of the first pair of network items;

generating a network prompt for a pairwise reranking module based on aggregating the first textual representation and the second textual representation;

inputting the network prompt into the pairwise reranking module;

receiving a token output from the pairwise reranking module by:

retrieving a parameter for the pairwise reranking module, wherein the parameter corresponds to a required number of outputs; and adjusting the parameter to correspond to one; and determining a modified ranking of the network items based on the token output.

15. The one or more non-transitory, computer-readable mediums of claim 14, wherein receiving the token output from the pairwise reranking module further comprises:

receiving a binary determination from the pairwise reranking module; and generating the token output based on the binary determination.

16. The one or more non-transitory, computer-readable mediums of claim 14, wherein receiving the token output from the pairwise reranking module further comprises:

retrieving a threshold number;

scoring each of the network items;

sorting each of the network items based on a respective scoring; and retrieving, based on the respective scoring, a number of items corresponding to the threshold number.

17. The one or more non-transitory, computer-readable mediums of claim 14, wherein determining, based on the network query, the initial ranking further comprises:

determining, based on a network query, a search criterion;

determining, based on the network query, one or more databases at a network location to search; and applying the search criterion to the one or more databases to determine the network items.

18. The one or more non-transitory, computer-readable mediums of claim 14, wherein a first optimization model supplements the pairwise reranking module by:

determining a size of the pairwise reranking module;

determining a threshold model size; and comparing the size to the threshold model size.

19. The one or more non-transitory, computer-readable mediums of claim 14, wherein a first optimization model supplements the pairwise reranking module by:

retrieving a network item baseline for a subset of network items; and comparing each of the first pair of network items to the network item baseline.

20. The one or more non-transitory, computer-readable mediums of claim 14, wherein a first optimization model supplements the pairwise reranking module by:

determining a format type for a network prompt; and modifying the network prompt based on the format type.

* * * * *